(12) United States Patent
Yeke Yazdandoost et al.

(10) Patent No.: US 11,816,295 B2
(45) Date of Patent: Nov. 14, 2023

(54) ELECTRONIC DEVICES HAVING MOISTURE-INSENSITIVE OPTICAL TOUCH SENSORS

(71) Applicant: Apple Inc., Cupertino, CA (US)

(72) Inventors: Mohammad Yeke Yazdandoost, San Francisco, CA (US); Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/738,912

(22) Filed: May 6, 2022

(65) Prior Publication Data
US 2022/0276738 A1 Sep. 1, 2022

Related U.S. Application Data

(62) Division of application No. 17/188,946, filed on Mar. 1, 2021, now Pat. No. 11,353,994.

(51) Int. Cl.
*G06F 3/042* (2006.01)
*G06F 3/041* (2006.01)

(52) U.S. Cl.
CPC ........ *G06F 3/0421* (2013.01); *G06F 3/04182* (2019.05); *G06F 2203/04109* (2013.01)

(58) Field of Classification Search
CPC ....... G06F 2203/04109; G06F 3/04182; G06F 3/0421; G06F 3/0425; G06F 3/0428
See application file for complete search history.

(56) References Cited

U.S. PATENT DOCUMENTS

| 8,144,271 | B2 | 3/2012 | Han |
| 9,536,129 | B2 | 1/2017 | Carver et al. |
| 9,830,019 | B2 | 11/2017 | Wassvik |
| 10,261,634 | B2 | 4/2019 | Huitema |
| 2004/0252867 | A1 | 12/2004 | Lan et al. |
| 2008/0029691 | A1 | 2/2008 | Han |
| 2008/0284925 | A1* | 11/2008 | Han ..................... G06F 3/0425 349/12 |
| 2009/0033637 | A1 | 2/2009 | Han |
| 2010/0302210 | A1 | 12/2010 | Han et al. |

(Continued)

FOREIGN PATENT DOCUMENTS

| EP | 2369404 B1 | 10/2016 |
| EP | 2245523 B1 | 11/2016 |

OTHER PUBLICATIONS

Maxwell, An Overview of Optical-Touch Technologies, Information Display 23.12 (2007), optical-touch technology, pp. 26-30.

*Primary Examiner* — Chun-Nan Lin
(74) *Attorney, Agent, or Firm* — Treyz Law Group, P.C.; G. Victor Treyz; Joseph F. Guihan

(57) ABSTRACT

An electronic device may have a touch sensitive display that is insensitive to the presence of moisture. An array of pixels in the display may be used to display images. A display cover layer may overlap the array of pixels. A light source may illuminate an external object such as a finger of a user when the object contacts a surface of the display cover layer. This creates scattered light that may be detected by an array of light sensors. The light source may supply light to an edge of the display cover layer at an angle that ensures total internal reflection within the display cover layer is sustained across the display cover layer even when the display cover layer is immersed in water or otherwise exposed to moisture.

18 Claims, 15 Drawing Sheets

(56) References Cited

U.S. PATENT DOCUMENTS

| | | | |
|---|---|---|---|
| 2016/0334942 A1* | 11/2016 | Wassvik | H01S 5/423 |
| 2017/0040306 A1* | 2/2017 | Kim | H05K 1/181 |
| 2017/0257534 A1 | 9/2017 | Huang et al. | |
| 2017/0316248 A1* | 11/2017 | He | G06V 40/12 |
| 2019/0002331 A1 | 1/2019 | Lezzi et al. | |
| 2019/0138154 A1 | 5/2019 | Smith et al. | |
| 2020/0132845 A1 | 4/2020 | Panas | |
| 2021/0011578 A1* | 1/2021 | Zhang | G06V 40/1324 |

* cited by examiner

ELECTRONIC DEVICES HAVING MOISTURE-INSENSITIVE OPTICAL TOUCH SENSORS

This application is a division of non-provisional patent application Ser. No. 17/188,946, filed Mar. 1, 2021, which is hereby incorporated by reference herein in its entirety.

FIELD

This relates generally to electronic devices, and, more particularly, to electronic devices with touch sensors.

BACKGROUND

Electronic devices such as tablet computers, cellular telephones, and other equipment are sometimes provided with touch sensors. For example, displays in electronic devices are often provided with capacitive touch sensors to receive touch input. It can be challenging to operate such sensors in the presence of moisture.

SUMMARY

An electronic device may have a touch sensitive display that is insensitive to the presence of moisture. The display may have a two-dimensional optical touch sensor such as a direct illumination optical touch sensor or a total internal reflection touch sensor. The optical touch sensor may be used to gather touch input while the electronic device is immersed in water or otherwise exposed to moisture.

An array of pixels in the display may be used to display images. A display cover layer may overlap the array of pixels. A light source may illuminate an external object such as a finger of a user when the object contacts a surface of the display cover layer. This creates scattered light that may be detected by an array of light sensors. The light source may supply light to an edge of the display cover layer at an angle that ensures total internal reflection is sustained within the display cover layer when the display cover layer is immersed in water or otherwise exposed to moisture.

DETAILED DESCRIPTION

Figure 1:
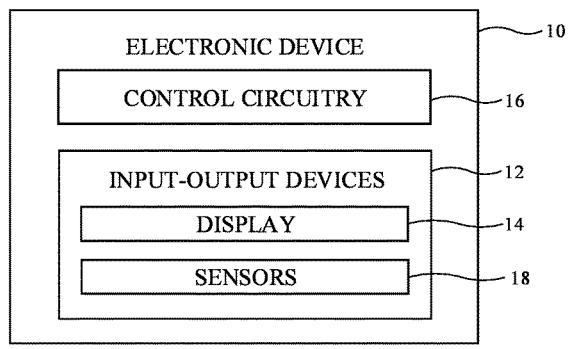
FIG. 1 is a schematic diagram of an illustrative electronic device in accordance with an embodiment.

A schematic diagram of an illustrative electronic device that may include an optical touch sensor is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a head-mounted device such as eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Illustrative configurations in which device 10 is a portable device such as a wristwatch, cellular telephone, or tablet computer and, more particularly, a portable device that is water resistant or waterproof may sometimes be described herein as an example.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, haptic output devices, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be an organic light-emitting diode display, a display formed from an array of crystalline semiconductor light-emitting diode dies, a liquid crystal display, or other display. Display 14 may be a touch screen display that includes an optical touch sensor for gathering touch input from a user. The optical touch sensor may be configured to operate even when device 10 is immersed in water or otherwise exposed to moisture. If desired, the optical touch sensor may also be configured to operate when a user is wearing gloves, which might be difficult or impossible with some capacitive touch sensors. Moreover, because the optical touch sensor operates optically, the touch sensor is not impacted by grounding effects that might impact the operation of capacitive touch sensors.

As shown in FIG. 1, input-output devices 12 may include sensors 18. Sensors 18 may include touch sensors. Touch sensors may be provided for display 14 and/or other portions of device 10 and may be formed from an array of capacitive touch sensor electrodes, acoustic touch sensor structures, resistive touch components, force-based touch sensor structures, light-based touch sensor structures, or other suitable touch sensor arrangements. Illustrative optical touch sensor arrangements for device 10 (e.g., for display 14 of device 10) are sometimes described herein as an example.

Sensors 18 may include capacitive sensors, light-based proximity sensors, magnetic sensors, accelerometers, force sensors, touch sensors, temperature sensors, pressure sensors, inertial measurement units, accelerometers, gyroscopes, compasses, microphones, radio-frequency sensors, three-dimensional image sensors (e.g., structured light sensors with light emitters such as infrared light emitters configured to emit structured light and corresponding infrared image sensors, three-dimensional sensors based on pairs of two-dimensional image sensors, etc.), cameras (e.g., visible light cameras and/or infrared light cameras), light-based position sensors (e.g., lidar sensors), monochrome and/or color ambient light sensors, and other sensors. Sensors 18 such as ambient light sensors, image sensors, optical proximity sensors, lidar sensors, optical touch sensors, and other sensors that use light and/or components that emit light such as status indicator lights and other light-emitting components may sometimes be referred to as optical components.

Figure 2:
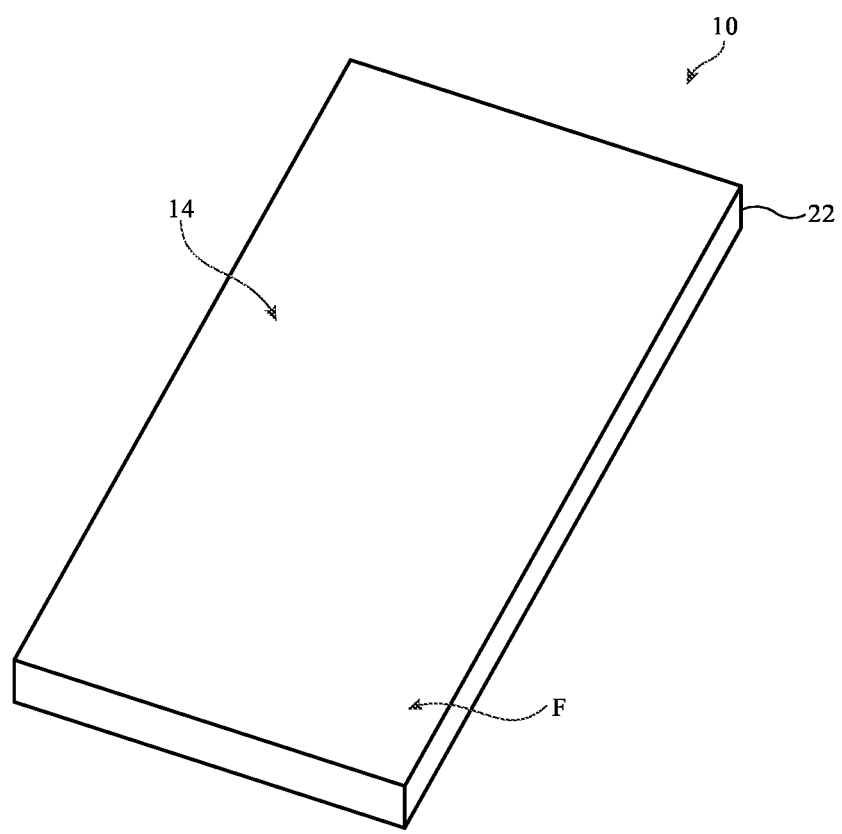
FIG. 2 is a perspective view of an illustrative electronic device in accordance with an embodiment.

A perspective view of an illustrative electronic device of the type that may include an optical touch sensor is shown in FIG. 2. In the example of FIG. 2, device 10 includes a display such as display 14 mounted in housing 22. Display 14 may be a liquid crystal display, a light-emitting diode display such as an organic light-emitting diode display or a display formed from crystalline semiconductor light-emitting diode dies, or other suitable display. Display 14 may have an array of image pixels extending across some or all of front face F of device 10 and/or other external device surfaces. The array of image pixels may be rectangular or may have other suitable shapes. Display 14 may be protected using a display cover layer (e.g., a transparent front housing layer) such as a layer of transparent glass, clear plastic, sapphire, or other clear layer. The display cover layer may overlap the array of image pixels.

Figure 3:
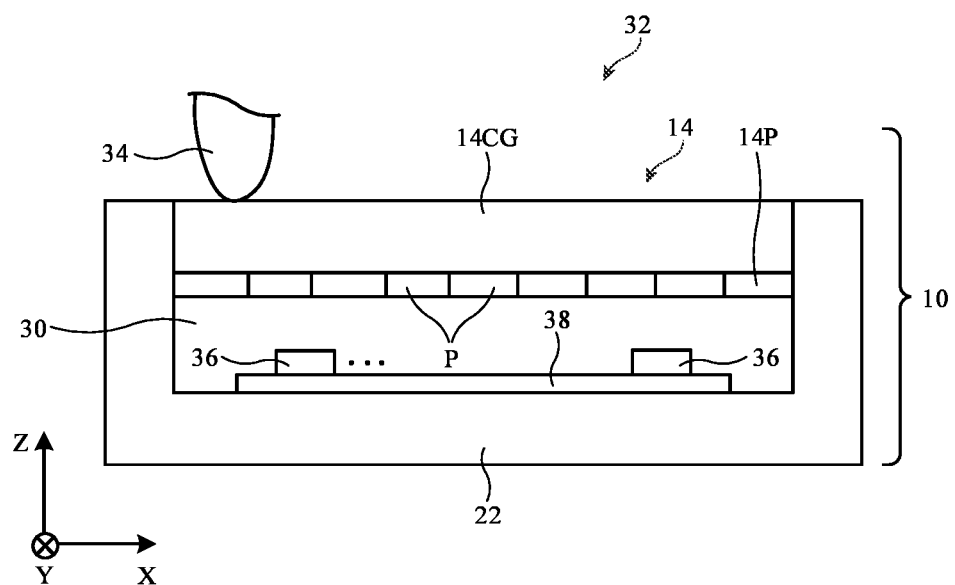
FIG. 3 is a cross-sectional side view of an illustrative electronic device in accordance with an embodiment.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. As shown in the cross-sectional side view of device 10 of FIG. 3, housing 22 and display 14 may separate an interior region of device 10 such as interior region 30 from an exterior region surrounding device 10 such as exterior region 32. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a strap may be coupled to a main portion of housing 22 (e.g., in configurations in which device 10 is a wristwatch or head-mounted device). Internal electrical components 36 (e.g., integrated circuits, discrete components, etc.) for forming control circuitry 16 and input-output devices 12 may be mounted in interior 30 of housing 22 (e.g., on one or more substrates such as printed circuit 38). In some configurations, components 36 may be attached to display 14 (e.g., circuitry may be mounted to the surface of display 14). To obtain touch input from a user's fingers or other external object (see, e.g., user finger 34), display 14 may include a touch sensor such as an optical touch sensor (e.g., a two-dimensional optical touch sensor that gathers information on the XY location of a user's finger or other external object when that object touches the surface of display 14).

Display 14 may include a display panel such as display panel 14P that contains pixels P covered by display cover layer 14CG. The pixels of display 14 may cover all of the front face of device 10 or display 14 may have pixel-free areas (e.g., notches, rectangular islands, inactive border regions, or other regions) that do not contain any pixels. Pixel-free areas may be used to accommodate an opening for a speaker and windows for optical components such as image sensors, an ambient light sensor, an optical proximity sensor, a three-dimensional image sensor such as a structured light three-dimensional image sensor, a camera flash, an illuminator for an infrared image sensor, an illuminator for a three-dimensional sensor such as a structured light sensor, a time-of-flight sensor, a lidar sensor, etc.

Figure 4:
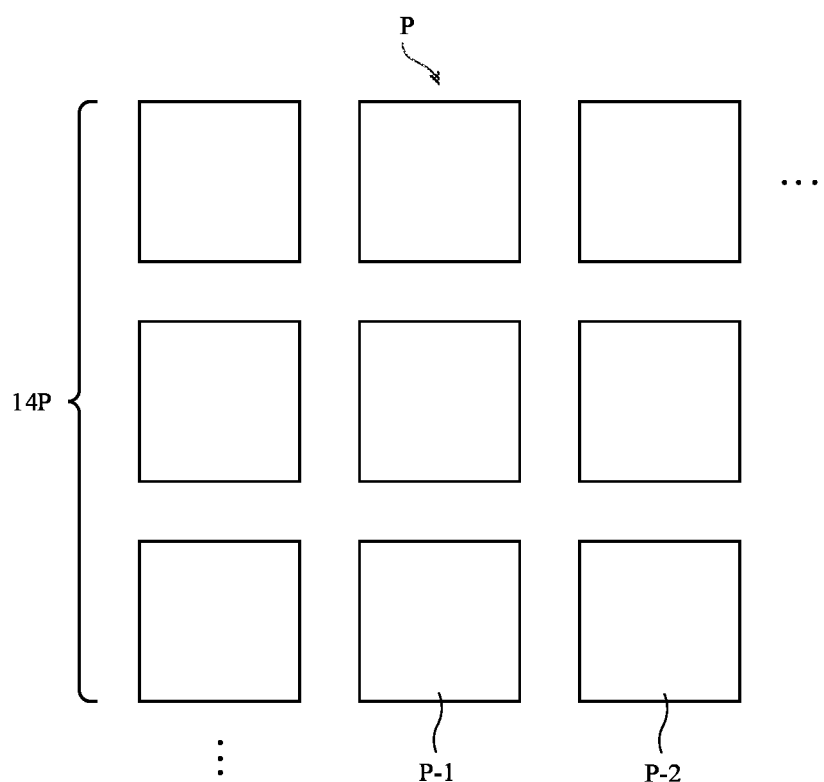
FIG. 4 is a top view of an illustrative array of pixels for an electronic device in accordance with an embodiment.

FIG. 4 is a top view of an array of illustrative pixels P in display panel (display) 14P. As shown in FIG. 4, pixels P may include image pixels such as pixel P-1 that are used in presenting images for a user of device 10. Image pixels in display 14 may, for example, include a rectangular array of red, green, and glue light-emitting diodes or backlight red, green, and blue liquid crystal display pixels for presenting color images to a user.

Pixels P may also contain optical touch sensor pixels such as pixel P-2. Optical touch sensor pixels may include pixels that serve as light detectors and/or light emitters. Emitted light that reflects from a user's finger on the surface of display 14 may be detected using the light detectors, thereby determining the location of the user's finger. If desired, diodes or other components may be used to form pixels that can be operated both as image pixels and as touch sensor pixels. When used as touch sensor pixels, image pixels can be configured to emit optical touch sensor illumination and/or to detect optical touch sensor light. For example, a display emitter can be used to produce image light for a display while also being used to produce optical touch sensor illumination, and/or while also being used to serve as a photodetector for an optical touch sensor.

Image pixels such as pixels P-1 and/or optical touch sensor pixels P-2 may have any suitable pitch. For example, image pixels may have a density that is sufficient to display high-quality images for a user (e.g., 200-300 pixels per inch or more, as an example), whereas optical touch sensor pixels may, if desired, have a lower density (e.g., less than 200 pixel per inch, less than 50 pixels per inch, less than 20 pixels per inch, etc.).

Image pixels emit visible light for viewing by a user. For example, in a color display, image pixels may emit light of different colors of image light such as red, green, and blue light, thereby allowing display 14 to present color images. Optical touch sensor pixels may emit and/or detect visible light and/or infrared light (and/or, if desired, ultraviolet light).

In some configurations, optical touch sensor light for illuminating a user's fingers passes directly through the thickness of display cover layer 14CG from its interior surface to its exterior surface. Optical touch sensors in which light that illuminates the user's fingers passes outwardly from light sources such as light-emitting pixels in display panel 14P directly through the thickness of display cover layer 14CG before being backscattered in the reverse (inward) direction to the light detectors of the optical touch sensors may sometimes be referred to herein as direct illumination optical touch sensors.

In other configurations, light for an optical touch sensor may be provided using edge-coupled light-emitting diodes or other light sources that emit light into the edge surface of display cover layer 14CG that is then guided within layer 14CG in accordance with the principal of total internal reflection. For example, a light-emitting diode may emit light into the righthand edge of display cover layer 14CG that is guided from the righthand edge of display cover layer 14CG to the opposing lefthand edge of display cover layer 14CG within the light guide formed by display cover layer 14CG. In this way, light may be guided laterally across layer 14CG in the absence of contact from a user's finger. When a user's finger touches the surface of layer 14CG, total internal reflection can be locally defeated. This local frustration of total internal reflection scatters light inwardly toward the light detectors of the optical touch sensor. Optical touch sensors that are based on locally defeating total internal reflection may sometimes be referred to herein as total internal reflection optical touch sensors. If desired, objects other than the fingers of users (e.g., a computer stylus, a glove, and/or other external objects with appropriate optical properties) may also locally defeat total internal reflection, thereby allowing the optical touch sensors to function over a wide range of operating environments.

Pixels P that emit light and pixels P that detect light in display panel 14P may be formed using shared structures and/or structures that are separate from each other. These structures may be located in the same plane (e.g., as part of a single layer of pixels on a single substrate) and/or may include components located in multiple planes (e.g., in arrangements in which some components are formed in a given layer and other components are formed in one or more additional layers above and/or below the given layer).

Consider, as an example, an optical touch sensor that contains an array of photodetectors formed from reverse-biased diodes. These diodes may be dedicated photodetectors or may be light-emitting didoes that serve as light detectors when reverse biased and that serve as light sources when forward biased. Light sources in the optical touch sensor may include visible light sources (e.g., visible light sources dedicated to use in the optical touch sensor or visible light sources that also serve as image pixels) and/or may include infrared light sources. Light-emitting pixels for the optical touch sensor may be formed from light-emitting diodes (e.g., dedicated light-emitting diodes or diodes that serve as light-emitting diodes when forward biased and that serve as photodetectors when reversed biased). Light-emitting pixels may also be formed from pixels P that are backlit with light from a backlight unit to form backlit pixels (e.g., backlit liquid crystal display pixels). In general, any type of photodetector signal processing circuitry may be used to detect when a photodetector has received light. For example, photodetectors may be configured to operate in a photoresistor mode in which the photodetectors change resistance upon exposure to light and corresponding photodetector signal processing circuitry may be used to measure the changes in photodetector resistance. As another example, the photodetectors may be configured to operate in a photovoltaic mode in which a voltage is produced when light is sensed and corresponding photodetector signal processing circuitry may be used to detect the voltage signals that are output from the photodetectors. Semiconductor photodetectors may be implemented using phototransistors or photodiodes. Other types of photosensitive components may be used, if desired.

Figure 5:
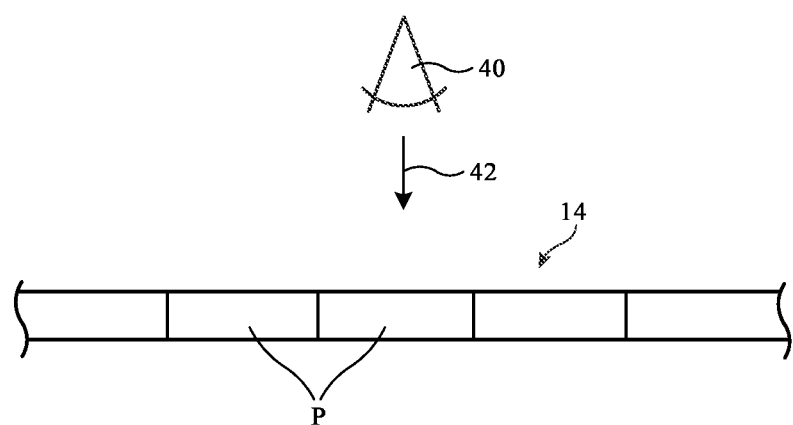
FIGS. 5 and 6 are cross-sectional side views of illustrative pixel arrays for electronic devices in accordance with embodiments.

FIG. 5 is a cross-sectional side view of an illustrative display having an array of pixels P that are not backlit. Pixels P of FIG. 5 may include light-emitting diodes (e.g., organic light-emitting diodes such as thin-film organic light-emitting diodes and/or light-emitting diodes formed from crystalline semiconductor light-emitting diode dies). During operation, image pixels formed from the light-emitting diodes may present an image on display 14 that is visible to a user such as viewer 40 who is viewing display 14 in direction 42.

Figure 6:
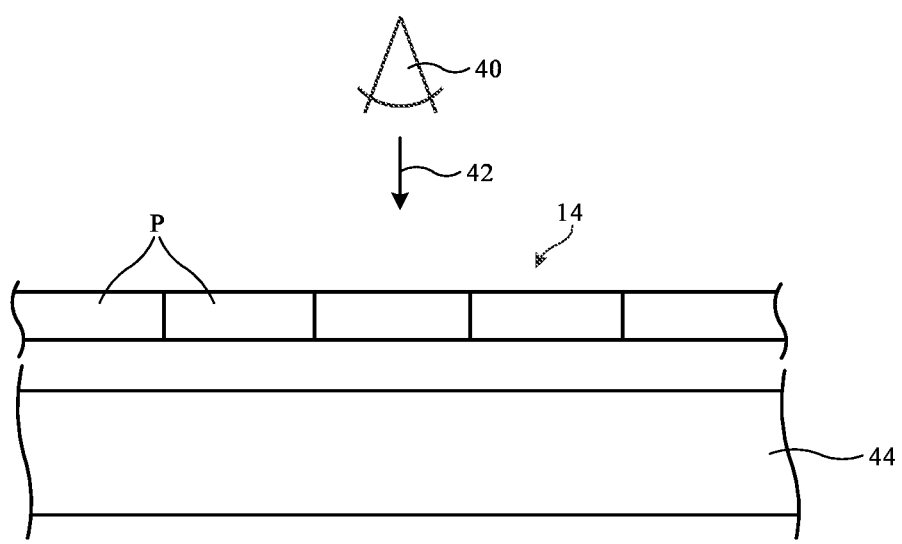

FIG. 6 is a cross-sectional side view of an illustrative display having an array of pixels P that are backlit using backlight unit 44. Backlight unit 44 may include one or more strips of light-emitting diodes that emit light into a backlight unit light guide layer (e.g., a clear optical film with light-scattering structures). As the emitted light propagates through the light guide layer, the scattered light serve as backlight illumination for pixels P (e.g., liquid crystal display pixels). In another illustrative configuration, backlight unit 44 is a direct lit backlight unit that contains an array of backlight light-emitting diodes that provide backlight (e.g., an array-type backlight unit that supports local dimming functionality).

Figure 7:
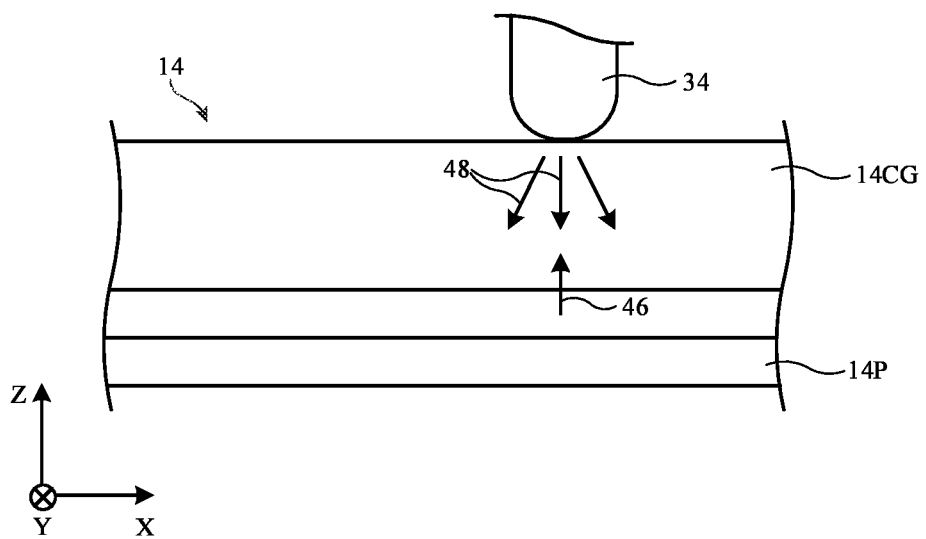
FIG. 7 is a cross-sectional side view of an illustrative optical touch sensor arrangement in accordance with an embodiment.

FIG. 7 is a cross-sectional side view of an illustrative display with a direct illumination optical touch sensor. As shown in FIG. 7, visible and/or infrared light sources associated with display panel 14P may emit illumination 46 that travels directly through display cover layer 14CG from its inner surface to its outer surface, thereby illuminating an external object contacting the surface of display 14 such as finger 34. This creates localized backscattered light 48 that propagates in the inward (−Z) direction and that is detected by photodetectors associated with display panel 14P that are directly below finger 34. In this way, the optical touch sensor can determine the lateral position (XY location) of finger 34.

Figure 8:
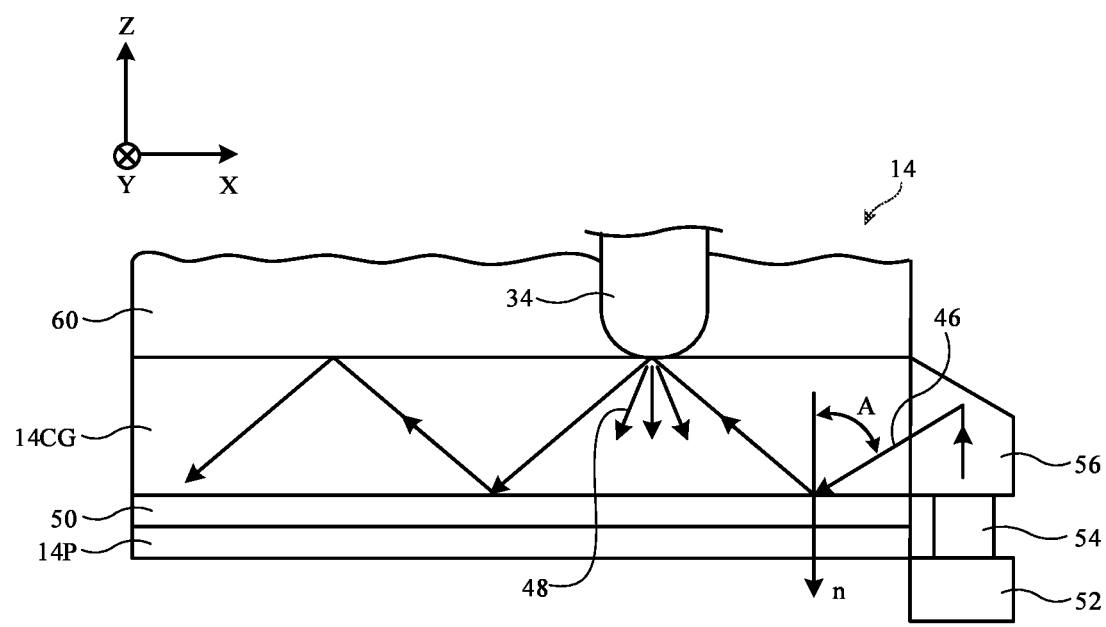
FIG. 8 is a cross-sectional side view of an illustrative optical touch sensor arrangement based on total internal reflection in accordance with an embodiment.

FIG. 8 is a cross-sectional side view of an illustrative display with a total internal reflection optical touch sensor. As shown in FIG. 8, display 14 may include display cover layer 14CG and display panel 14P. Image pixels in panel 14P may display images that are viewable by a viewer through display cover layer 14CG. The outermost surface of display panel 14P may be separated from the opposing innermost surface of display cover layer 14CG by layer 50. Layer 50 may be formed from air, liquid, polymer (e.g., polymer adhesive such as optically clear adhesive, pressure sensitive adhesive, other polymer materials, etc.), glass, other materials, and/or combinations of these materials. Light 46 maybe coupled into layer 14CG through the sidewalls of layer 14CG (e.g., at the righthand edge surface at the peripheral of display cover layer 14CG in the example of FIG. 8).

Any suitable optical coupling structures may be used to direct light 46 into display cover layer 14CG. In the example of FIG. 8, light 46 is emitted by a light source such as light source 52. Light source 52 may be a light-emitting diode such as a visible or infrared light-emitting diode or a visible or infrared laser diode. Collimator 54 may be used to collimate the emitted light from light source 52 (e.g., to form a beam of light with parallel light rays). A prism such as prism 56 or other optical coupler may be coupled between collimator 54 and display cover layer 14CG. Prism 56 may, for example, be mounted to the edge of display cover layer 14CG to help direct light into the edge of display cover layer 14CG. During operation, optical coupling structures such as collimator 54 and a prism or other optical coupler may be used to couple light 46 that is emitted from light source 52 into the interior of display cover layer 14CG in a beam that is oriented at a desired angle relative to the surfaces of layer 14CG (e.g., at an angle A with respect to surface normal n of display cover layer 14CG). At this angle A, light 46 will propagate within layer 14CG in accordance with the principal of total internal reflection unless total internal reflection is locally defeated by the presence of finger 34 on the outer surface of layer 14CG.

Angle A is selected (and the materials used for layer 14CG and layer 50 are selected) so that light 46 will reflect from the innermost surface of layer 14CG in accordance with the principal of total internal reflection. Layer 14CG may, as an example, have a refractive index n1 (e.g., 1.5 for glass or 1.76 for sapphire as examples), whereas layer 50 may have a refractive index n2 that is less than n1 (e.g., less than 1.5 when layer 14CG is glass or less than 1.76 when layer 14CG is sapphire). The refractive index difference between n1 and n2 may be at least 0.05, at least 0.1, at least 0.2, or other suitable value).

Angle A is also selected so that light 46 will reflect from the uppermost surface of layer 14CG in accordance with the principal of total internal reflection (in the absence of finger 34). In some environments, device 10 will be immersed in water 60 or otherwise exposed to moisture (rain droplets, perspiration, fresh or salt water surrounding device 10 when a user is swimming, etc.). Angle A is preferably selected to ensure that the presence of water 60 will not defeat total internal reflection while ensuring that the presence of finger 34 will locally defeat total internal reflection and thereby produce localized scattered light 48 for detection by the nearby photodetectors of the optical touch sensor. This allows the total internal reflection optical touch sensor to operate whether or not the some or all of the surface of display 14 is immersed in water or otherwise exposed to moisture.

Consider, as an example, a first illustrative scenario in which layer 14CG is formed from a material with a refractive index of 1.5 (e.g., glass). Finger 34 may be characterized by a refractive index of 1.55. Water 60 may be characterized by a refractive index of 1.33. Layer 50 may have a refractive index of less than 1.5. In this first scenario, total internal reflection at the upper surface of layer 14CG when water 60 is present is ensured by the selection of a material for layer 14CG with a refractive index greater than water and by selecting angle A to be greater than the critical angle at the upper surface of layer 14CG (in this example, greater than 62.46°, which is the critical angle associated with total internal reflection at the glass/water interface). To ensure total internal reflection is sustained at the lower surface of layer 14CG, the selected value of A should be greater than the critical angle associated with the lower interface. If, as an example, layer 50 is formed from a material with a refractive index of 1.33 (the same as water) or less, the critical angle associated with the lower interface will be at least 62.46°, so A should be greater than 62.46°. If, on the other hand, layer 50 is formed from a material with a refractive index between 1.33 and 1.5, the critical angle at the lower interface will be increased accordingly and the angle A should be increased to be sufficient to ensure total internal reflection at the lower interface. Regardless of which value is selected for angle A, total internal reflection will be supported at both the lower and upper surfaces of layer 14CG (whether layer 14CG is in air or immersed in water), so long as finger 34 is not present. Because finger 34 has a refractive index (1.55) that is greater than that of layer 14CG (which is 1.5 in this first scenario), whenever finger 34 is present on the upper surface of layer 14CG, total internal reflection will be defeated at finger 34, resulting in scattered light 48 that can be detected by the light detectors of the total internal reflection optical touch sensor associated with display 14.

The refractive index of layer 14CG need not be less than the refractive index of finger 34. Consider, as an example, a second illustrative scenario in which layer 14CG is formed from a crystalline material such as sapphire with a refractive index of 1.76. In this second scenario, the angle A should be selected to be both: 1) sufficiently high to ensure that total internal reflection is sustained at the upper (and lower) surfaces of layer 14CG in the absence of finger 34 (even if water 60 is present) and 2) sufficiently low to ensure that total internal reflection at the upper surface will be locally defeated when finger 34 is touching the upper surface to provide touch input. Total internal reflection at the upper surface may be ensured by selecting a value of A that is greater than the critical angle associated with a sapphire/water interface (e.g., the value of angle A should be greater than arcsin(1.33/1.76), which is 49.08°). Total internal reflection at the lower interface is ensured by selecting a material for layer 50 that has an index of refraction of 1.33 or less (in which case A may still be greater than 49.08°) or by selecting a material for layer 50 that has a larger index (but still less than 1.55) and adjusting the value of A upwards accordingly. To ensure that total internal reflection at the upper surface can be defeated locally by finger 34, the value of angle A should be less than the critical angle associated with a sapphire/finger interface (e.g., less than arcsin(1.55/1.76), which is 61.72°). Thus, in scenarios in which the refractive index of layer 14CG is greater than the refractive index of finger 34, there will be a range of acceptable values for A bounded by a lower limit (e.g., 49.08° in this example) and an upper limit (e.g., 61.72° in this example).

Figure 9:
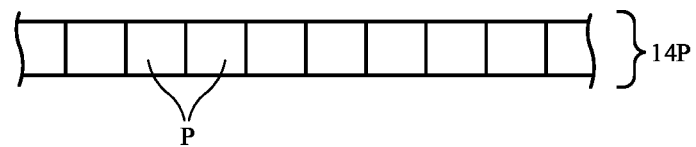
FIGS. 9, 10, and 11 are cross-sectional side views of illustrative display and sensor arrangements with different numbers of pixel layers in accordance with embodiments.
Figure 10:
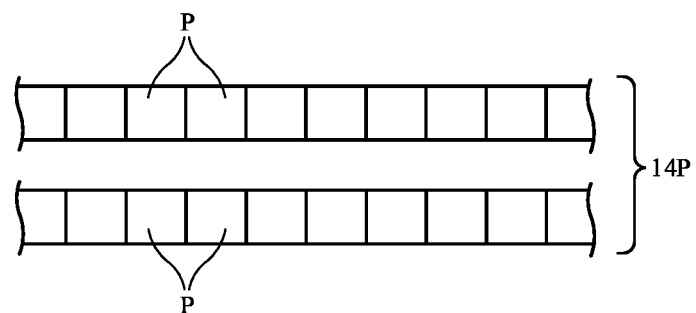
Figure 11:
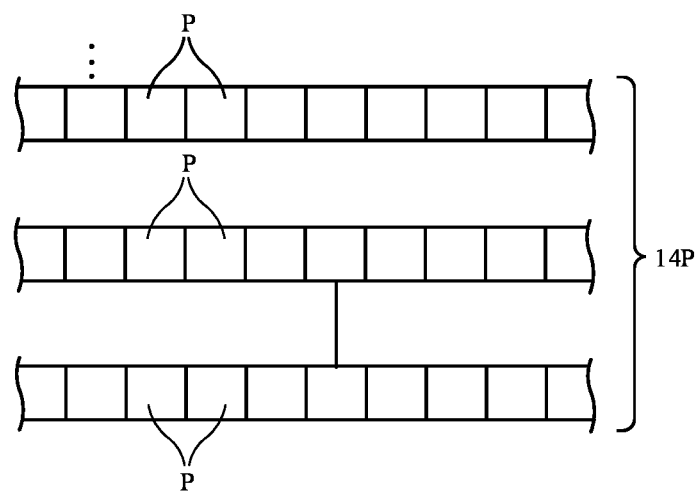

In display 14 (e.g., in display panel 14P), the image pixels that are used in displaying images for a user (e.g., the red, blue, and green pixels in a color display) and/or the optical touch sensor pixels (e.g., light emitters and/or detectors for implementing a direct illumination and/or total internal reflection optical touch sensor) may be implemented using one or more layers of pixels, as shown in the cross-sectional side view of the illustrative displays of FIGS. 9, 10, and 11. FIG. 9 is an illustrative arrangement for display panel 14P that has a single layer of pixels P. In FIG. 10, two layers of pixels P are used in display panel 14P. The diagram of FIG. 11 shows how display panel 14P may, if desired, have three or more layers of pixels P. In general, optical touch sensor pixels may be located in the same layer as image sensor pixels and/or may be located in a layer that is above or below the image sensor pixels.

Pixels P of FIGS. 9, 10, and 11 may include image pixels and/or optical touch sensor pixels. In some arrangements, pixels P may include backlight pixels that supply backlight illumination in a local dimming backlight unit. The pixels P in different layers may have the same pitch or different pitches. As an example, there may be more image pixels per inch than optical touch sensor pixels. Thin-film structures and/or discrete devices may be used in forming pixels P. In some embodiments of display panel 14P (e.g., displays with a total internal reflection optical touch sensor), light sources for the optical touch sensor may be configured to provide edge illumination (see, e.g., light source 52 of FIG. 8) in addition to or instead of using light sources in pixels P.

Figure 12:
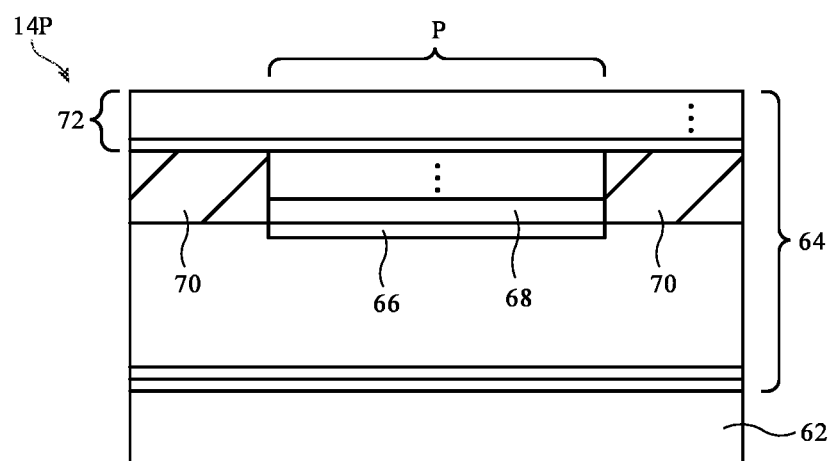
FIG. 12 is a cross-sectional side view of an illustrative pixel with thin-film circuit structures in accordance with an embodiment.

FIG. 12 is a cross-sectional side view of an illustrative display panel with thin-film optical structures for forming pixels P. Pixel P of display panel 14P of FIG. 12 may be a thin-film diode (e.g., an organic light-emitting diode and/or a thin-film organic photodetector or other thin-film photodetector formed from a reverse biased thin-film diode). As shown in FIG. 12, panel 14P may have a substrate 62. Substrate 62 may be formed from glass, polymer, and/or other materials. One more layers of material such as thin-film layers 64 may be formed on substrate 62. Layers 64 may include buffer layers, dielectric layers and layers of metal traces for forming an interconnect stack, thin-film semiconductor layers for diodes, thin-film transistors, capacitors, and other thin-film circuitry, organic layers (e.g., organic emissive layers), encapsulation layers (e.g., encapsulation layers formed from silicon oxide, silicon nitride, other inorganic dielectric materials, and/or organic dielectric encapsulation materials), and/or other layers. In the example of FIG. 12, layers 64 include a patterned layer (e.g., a patterned metal layer) forming anode 66, organic layer(s) 68 such as emissive layers for a light-emitting diode, patterned pixel definition layer 70 (e.g., a dark polymer layer that has openings for respective anodes 66 for diodes, which each also have an opposing overlapping transparent cathode such as a global cathode that overlaps layer 70 and layers 68), and encapsulation layer(s) 72. Other thin-film circuitry may be formed on substrates such as substrate 62 to form display panel structures (e.g., one or more layers of pixels P for panel 14P), if desired.

Figure 13:
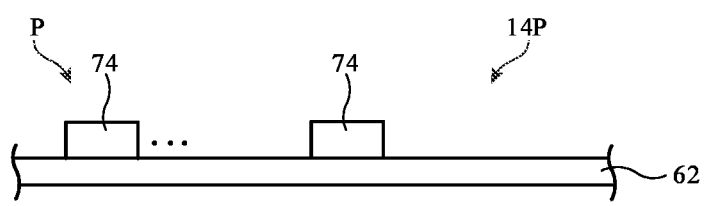
FIG. 13 is a cross-sectional side view of illustrative pixels formed from crystalline semiconductor dies in accordance with an embodiment.

FIG. 13 is a cross-sectional side view of an illustrative display panel with crystalline semiconductor dies 74 on substrate 62. Dies 74 may include visible and/or infrared light-emitting diodes for pixels P and/or photodetectors (e.g., diodes that may be reverse biased). Substrate 62 of FIG. 13 may be a flexible or rigid layer of polymer forming a flexible or rigid printed circuit or may be formed from other substrate materials.

Display panels 14P of FIGS. 12 and 13 are illustrative. In general, one or more layers of pixels P may be formed using one or more display panel structures (e.g., stacked panels) of the types shown in FIG. 12 (e.g., one or more thin-film panels and/or one or more panels of dies mounted on printed circuits) and/or FIG. 13. To help ensure sufficient transparency when layers of pixels overlap each other, the upper layer(s) of pixels may have transparent areas. For example, in a scenario in which pixels P of FIG. 12 overlaps infrared light sources for a touch sensor, anodes 66 may be configured to be sufficiently transparent to infrared wavelengths to allow infrared light from the infrared light sources to pass through anodes 66. In this type of arrangement, the pixels P in FIG. 12 may be image pixels that emit visible light. Infrared light sources and detectors (e.g., sources and detectors formed using diodes 74 of FIG. 13) may be located below the image pixels (as an example). Transparency in the upper layer(s) of a display with stacked layers of pixels P may be also be provided by forming layers such as layer 70, other layers 64 of FIG. 12, and/or layers such as substrate 62 of FIG. 13 from transparent material, by forming holes in substrate layers, pixel definition layers, and/or other display layers, by selectively omitting some or all of the anodes or other structures in certain pixels P to create transparent window regions in a layer of pixels, etc.

Figure 14:
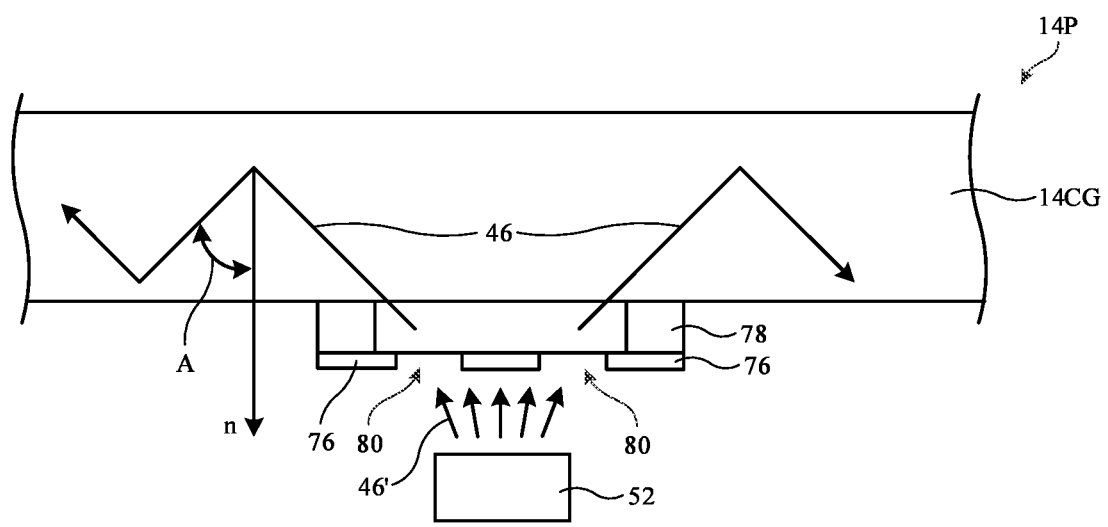
FIG. 14 is a cross-sectional side view of an illustrative light source configured to emit light into a display cover layer through an index-matching structure in accordance with an embodiment.

As described in connection with FIG. 8, one or more light-emitting diodes or other light sources such as light source 52 may be used (with an optical coupler) to emit a beam of light 46 into display cover layer 14CG at a desired angle A in a total internal reflection optical touch sensor. If desired, light 46 may be coupled into layer 14CG for total internal reflection using one or more overlapped light sources 52 (e.g., an array of infrared and/or visible light sources such as light-emitting diodes and/or laser diodes that lie below an array of image pixels in panel 14P). As shown in FIG. 14, for example, display panel 14P may have an array of light sources 52 each of which emits light 46' in a vertically oriented cone. Index-matching structures such as layer 78 may be provided with a refractive index value equal to or close to that of layer 14CG to help couple emitted light from each source 52 into layer 14CG and/or may include gratings or other optical coupling structures. The lowermost surface of layer 78 may, if desired, be angled with respect to surface normal n of layer 14CG (e.g., for form a prism) and/or may contact source 52 to help receive light 46' from source 52 without undesired reflections. The configuration of FIG. 14 is illustrative. Mask 76 may be formed on layer 78. Mask 76 may have a ring-shaped opening 80 or other opening that restricts the angular orientation of light 46' as light 46' passes through mask 76 and layer 78 into layer 14CG. In this way, the light from source 52 is characterized by rays of light 46 in layer 14CG that are oriented at a desired angle A with respect to surface normal n to support total internal reflection in layer 14CG in the absence of finger 34. Light sources such as light source 52 of FIG. 14 may be pixels P that are located in, above, and/or below image pixels in panel 14P. If desired, light sources such as light source 52 of FIG. 14 may be formed from multiple light sources (e.g., light source stacked on top of each other or mounted side-by-side on a shared substrate). In this type of arrangement, each of the multiple light sources may be optimized for a particular function. for example, one light source may be configured to produce display illumination and another may be configured to produce collimated total internal reflection illumination for the optical touch sensor.

It may be desirable to restrict the acceptance angles associated with a given light-detecting pixel. For example, it may be desirable to provide photodetector pixels in an optical touch sensor with angular filters that cause the photodetector pixels to be primarily or exclusively responsive to scattered light rays that are perpendicular to the surface normal n of layer 14CG (e.g., light rays that are traveling directly inward from layer 14CG after scattering from a user's finger 34). In this way, the impact of noise from stray light may be reduced.

Figure 15:
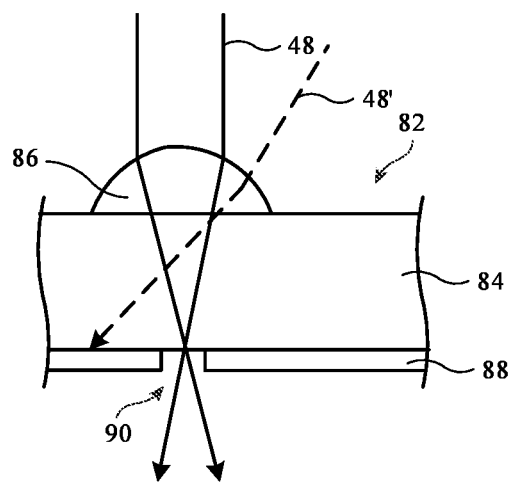
FIGS. 15, 16, 17, 18, and 19 are cross-sectional side views of illustrative apertures that may be placed over light detectors in accordance with embodiments.

Increased sensitivity to light of a desired angular orientation may be achieved using angle-of-acceptance light filters. Consider, as an example, the arrangement of FIG. 15. As shown in FIG. 15, angular filter 82 may be formed from mask 88 on a transparent layer 84. An optional lens such as lens 86 may overlap and be aligned with opening 90 in mask 88. Mask 88 may be formed from black ink, metal, or other opaque masking materials. Opening 90 may be a circular aperture or other gap in the opaque layer of mask 88. Transparent layer 84 may be one of the layers in panel 14P such as an encapsulation layer or other clear dielectric layer.

In the configuration of FIG. 15, only scattered rays of light 48 that are propagating perpendicular to layer 14CG (e.g., parallel to surface normal n of layer 14CG) will pass through opening 90 after passing through lens 86. Off-axis light rays such as off-axis scattered light ray 48' of FIG. 15 will be blocked by mask 88. A light detecting pixel for the optical touch sensor may be located under opening 90 in alignment with opening 90, so that on-axis light can be detected.

Figure 16:
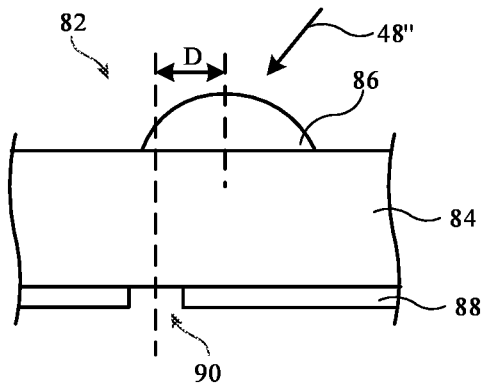

If desired, filters such as filter 82 may be configured to pass only to off-axis light of a desired angle (see, e.g., filter 82 of FIG. 16, which may pass only off-axis light rays 48" to an overlapped light-detector due to the lateral offset D between the center of lens 86 and the center of opening 90). Off-axis filters such as filter 82 of FIG. 16 may be used in panel 14P, on edge surfaces of layer 14CG, and/or at other locations in device 10 associated with an optical touch sensor (e.g., to help improve detection sensitivity by gathering only rays of light at particular angles associated with finger-scattered light, guided light, etc.).

Figure 17:
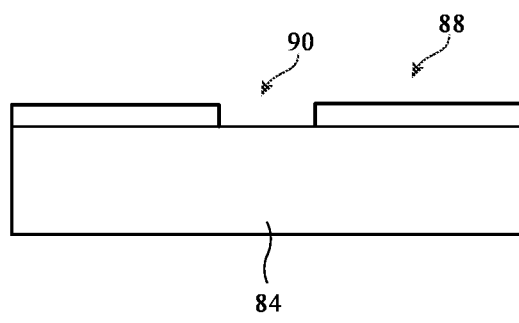
Figure 18:
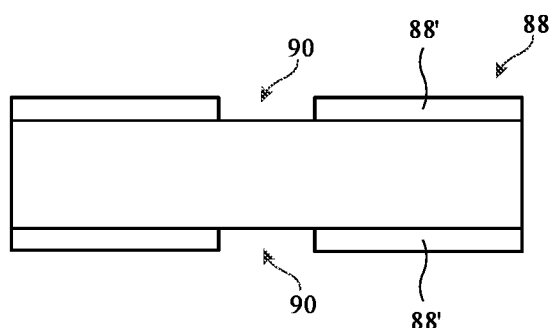
Figure 19:
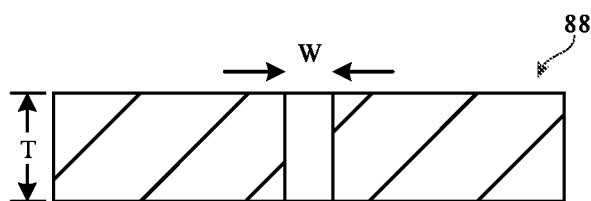

Masks such as mask 88 of FIGS. 15 and 16 may be formed on any suitable transparent layer(s) 84. In the example of FIG. 17, a single mask layer is being used to form mask 88 and that single mask layer is on the top surface of transparent layer 84. In the example of FIG. 18, mask 88 has first and second mask layers 88' on opposing upper and lower surfaces of layer 84 (e.g., an encapsulation layer or other transparent display layer). FIG. 19 shows how mask 88 may be formed from a through-hole aperture in a relatively thick display layer (e.g., a pixel definition layer or other opaque display layer). In the FIG. 19 configuration, the width W of opening 90 is smaller than the thickness T of the opaque layer forming mask 88. Masks such as the masks of FIGS. 17, 18, and 19 may be used with or without one or more lenses such as lens 86. The angular light filters formed using lenses 86 and/or masks 88 may each overlap and be aligned with a respective light detector (e.g., a pixel P with a photodetector) or may otherwise be used to help restrict the angular acceptance of the light detectors in the optical touch sensor.

Optical touch sensor measurements may be gathered during periods of time in which image light is not being output from display 14 or may be gathered during the periods of time in which image light is displayed.

Figure 20:
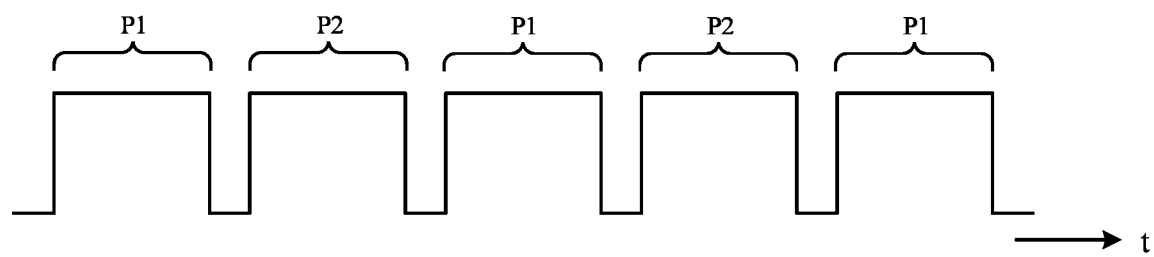
FIGS. 20 and 21 are timing diagrams showing how light-emitting pixels and light-sensing pixels may operate in an electronic device in accordance with embodiments.

Consider, as a first example, an arrangement of the type shown in the timing diagram of FIG. 20. In FIG. 20, time periods P1 correspond to time periods in which image pixels are outputting light for an image that is being viewed by a user and periods P2 are periods of time in which light detecting pixels for an optical touch sensor are gathering sensor measurements. In one illustrative arrangement, all image pixels in display 14 emit light only during periods P1 (e.g., image frames) and all light detecting pixels in display 14 make sensor measurements to detect scattered light from finger 34 only during periods P2 between periods P1. In this type of operation, optical touch sensor illumination is provided using light sources separate from the image pixels in display 14. In another illustrative arrangement, the image output operations of periods P1 and the light sensing operations of periods P2 may overlap. When optical touch sensor illumination is being produced by image pixels, the optical touch sensor may use image pixel modulation and/or knowledge of the intensity of image pixel output at each location on display 14 to help analyze the detected scattered light. When optical touch sensor illumination is being provided from a light source producing totally internally reflected light in display cover layer 14CG, both the optical touch sensor light from the light source and image pixel light may be produced during periods P2.

Figure 21:
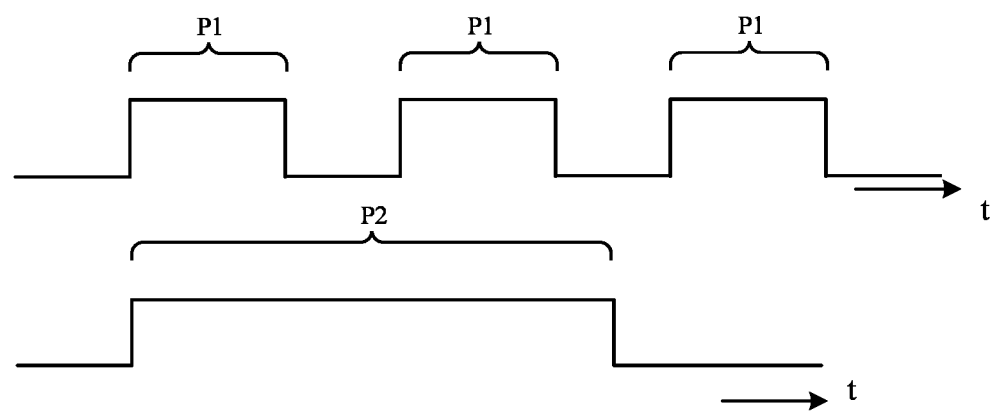

As shown in FIG. 21, images may be output during periods P1 (e.g., image frames) while optical touch sensor measurements are made during overlapping time periods P2. As an example, light for illuminating finger 34 may be produced by image pixels during periods P2 or may be produced during periods P2 by separate light sources (e.g., infrared light-emitting diodes or other infrared light-emitting pixels that are separate from the image pixels of display 14). Light-sensing pixels (e.g., infrared light-sensing pixels or visible light sensing pixels) may gather scattered light measurements during periods P2. In some arrangements (e.g., when infrared light is being used for optical touch sensing), light-sensing pixels may have optical filters that block visible light and pass infrared light to reduce potential visible light interference from image pixels. In configurations in which visible light is used to illuminate finger 34, image frame information on which image pixels are active across display 14 may be used in determining how much visible light is expected to be scattered by finger 34 at a given location on display 14.

Signal modulation techniques (e.g., modulation of emitted light with a known pattern over time, at a predetermined frequency, etc. and corresponding demodulation of sensed light) may be used to help extract optical touch sensor signals from detected ambient light signals and/or measured signals associated with stray image light. For example, emitted light may be modulated at a particular frequency and detected light signals demodulated (synchronously) at the same frequency. In this way, external optical interference from ambient light sources and internal optical interference (e.g., interference from stray display light, which may be produced during sensing periods in some embodiments) may be rejected.

Figure 22:
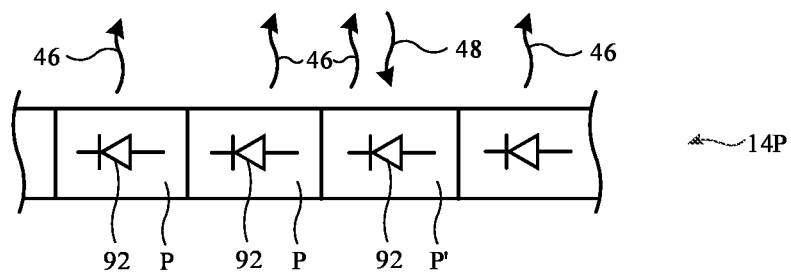
FIG. 22 is a cross-sectional side view of an illustrative pixel array of the type that may include light sensing pixels in accordance with an embodiment.

As shown in the example of FIG. 22, display panel 14P may include pixels P that each include a respective diode 92. Pixels P may use diodes 92 as light sources. For example, diodes 92 may be forward biased to serve as image pixels that emit visible light that forms images for a user. Emitted light 46 from diodes 92 may also serve as illumination for an optical touch sensor (e.g., light 46 may be backscattered in the presence of finger 34 on display 14 to form backscattered light 48). Diodes 92 may be light-emitting diodes (thin-film organic light-emitting diodes or crystalline semiconductor dies) or laser diodes. In some configurations, diodes 92 may be configured to emit infrared light. In total internal reflection optical touch sensor arrangements, illumination for finger 34 may, if desired, be supplied by providing display cover layer 14CG with edge illumination, as described in connection with FIG. 8.

Some or all of diodes 92 may be reversed biased to serve as photodetectors for the optical touch sensor. The photodiodes may, as an example, extend in an array across display 14, so that the photodiodes may measure and thereby determine the location of backscattered light 48 from finger 34.

The diodes 92 that serve as photodetectors in the optical touch sensor may be used exclusively as optical touch sensor light detectors or may sometimes be forward biased to emit light for images and/or optical touch sensor illumination and sometimes reverse biased to serve as photodetectors for the optical touch sensor. Light-detecting diodes 92 may, as an example, sometimes emit visible images light (e.g., while serving as image pixels) and may sometimes detect backscattered light 48 (see, e.g., pixels P', in which diodes 92 is configured both to emit light 46 and to detect light 48). In arrangements in which diodes 92 can serve both as light emitters and light detectors, the use of additional optical components to form the optical touch sensor (e.g., additional light-emitting devices and/or light sensors) may be reduced or eliminated.

Figure 23:
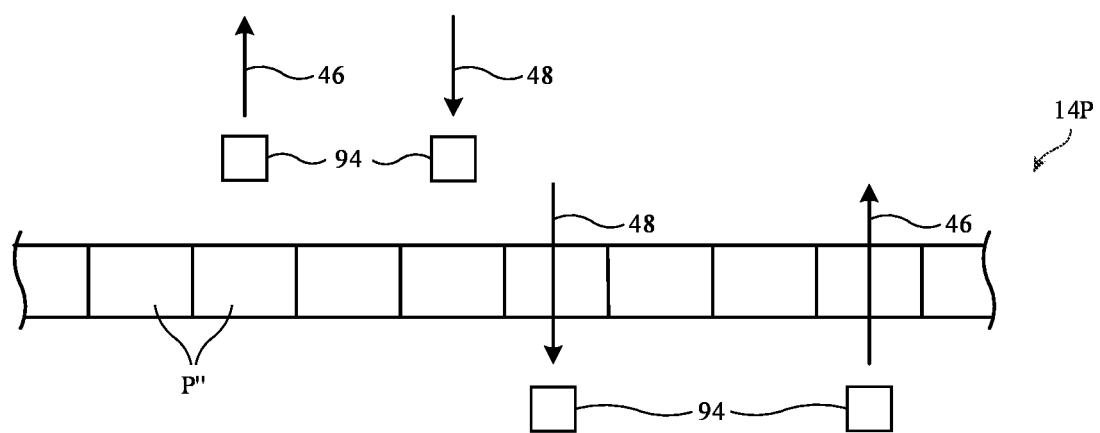
FIG. 23 is a cross-sectional side view of an illustrative display with an optical touch sensor formed from components located above and/or below an array of image pixels in accordance with an embodiment.

If desired, additional components for optical touch sensor pixels may be formed above or below an array of pixels. Consider, as an example, the cross-sectional side view of display panel 14P of FIG. 23. In the example of FIG. 23, pixels P''' are formed in a single layer (e.g., a layer of thin-film pixels on a flexible or rigid display panel substrate as described in connection with pixel P of FIG. 12 or a layer of crystalline semiconductor dies that form pixels as described in connection with pixels P of FIG. 13). In an illustrative configuration, pixels P''' in display panel 14P of FIG. 23 form a layer of image pixels that emit visible light for producing images viewed by a user of device 10. Configurations in which pixels P''' have diodes that can be reverse biased to form photodetectors for an optical touch sensor and/or that have infrared diodes for providing optical touch sensor illumination may also be used.

As shown in FIG. 23, optical components 94 may be located above and/or below pixels P'''. Optical components 94 may be based on diodes (e.g., diodes that emit light such as light-emitting diodes and laser diodes, diodes that detect light such as photodiodes, and/or diodes that may be forward biased to emit light and reversed biased to detect light). Diodes and/or other structures forming components 94 may be thin-film diodes (e.g., organic light-emitting diodes, organic thin-film diodes that serve as photodetectors, etc.) and/or may be formed from crystalline semiconductor dies. Components 94 may be mounted on one or more substrates such as substrate 62 of FIG. 13, may be mounted on a shared substrate with the structures of pixels P''', and/or may be otherwise incorporated into display panel 14P.

In some configurations, light-emitting components 94 may be located above pixels P''' and light-detecting components 94 may be located below pixels P'''. In other configurations, light-emitting components 94 may be located below pixels P''' and corresponding light-detecting components for the optical touch sensor may be located above pixels P'''. Arrangements in which some light-emitting components 94 are mounted above and below pixels P''' and/or in which some light-sensing components 94 are mounted above and below pixels P''' may also be used. Pixels P''' and/or components 94 may operate using visible and/or infrared light.

In arrangements in which optical touch sensor components 94 are formed above pixels P''', the substrate on which components 94 are mounted may be transparent to light emitted and/or detected by pixels P'''. In arrangements in which optical touch sensor components 94 are formed below pixels P''', the anodes of pixels P''', the pixel definition layer used in forming pixels P''', and/or other structures of the pixel array forming pixels P''' may be sufficiently transparent (by using materials that pass infrared and/or visible light, by forming openings, etc.) to allow components 94 to operate through the layer of pixels P'''. As an example, pixels P''' may be contained in a thin-film organic light-emitting diode display panel with anodes that are sufficiently transparent to pass infrared light for the optical touch sensor and components 94 may include infrared light-emitting diode dies and infrared photodetector dies mounted on a substrate layer that is below pixels P'''. In total internal reflection optical touch sensors, light (e.g., infrared light or visible light) for the optical touch sensor may be emitted into display cover layer 14CG and backscattered light 48 may be detected by photodetectors (e.g., light-sensing components 94 above and/or below pixels P''').

Figure 24:
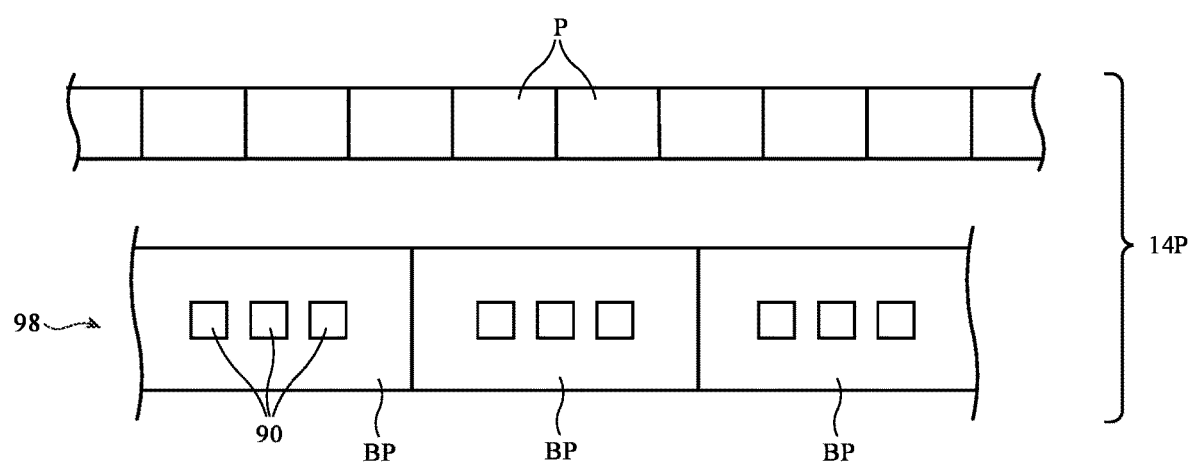
FIG. 24 is a cross-sectional side view of an illustrative display with backlight unit pixels that may be used in forming optical touch sensor structures in accordance with an embodiment.

If desired, backlight pixels may be used in forming an optical touch sensor. Consider as an example, display panel 14P of FIG. 24. In this example, an array of image pixels P may be formed using liquid crystal display pixels in a liquid crystal display panel. Backlight unit 98 may emit backlight illumination that passes through the liquid crystal display panel formed by pixels P. Backlight unit 98 may have an array of backlight pixels BP that can be locally dimmed to enhance image contrast (e.g., backlight unit 98 may be a direct-lit backlight unit that supports local dimming). Backlight pixels BP may contain optical components 96. Components 96 may include white-light backlight pixels or other backlight pixels that produce backlight illumination for pixels P. Components 96 may also include light sources (visible and/or infrared) and/or light detectors (visible and/or infrared) for forming an optical touch sensor. As an example, each backlight pixel BP may have a backlight illumination component such as a light-emitting diode that emits backlight illumination (e.g., white light backlight illumination) may have an infrared light source (e.g., an infrared light-emitting diode or infrared laser), and may each have an infrared light detector (e.g., an infrared photodetector). The infrared light sources and detectors in this type of arrangement may be mounted on a common substrate with the backlight illumination light-emitting diodes and/or may be mounted on other substrates (above and/or below the backlight illumination light-emitting diodes). Arrangements in which visible light from the backlight light-emitting diodes is used to produce optical touch sensor illumination (e.g., light 46 that illuminates a user's finger to produce backscattered light 48) may also be used.

Although sometimes described in the context of an arrangement in which touch sensor operation occurs through light that is propagating within display cover layer 14CG primarily at a single angle, the light source may emit light into display cover layer 14CG at multiple distinct angles (e.g., an angle A1 and different angle A2). In this type of arrangement, a first object with a first refractive index nfirst may locally defeat total internal reflection for light at angle A1 while not locally defeating total internal reflection for light at angle A2, whereas a second object with a second refractive index nsecond that is greater than the first refractive index may locally defeat total internal reflection for both light at angle A1 and light at angle A2. Because the first and second objects interact differently with the optical touch sensor, the touch sensor can discriminate between the first and second objects. This allows device 10 to respond differently to input from the different types of objects. As an example, in a drawing application, lines may be drawn with a first thickness when the first object is moved across layer 14CG, whereas lines may be drawn with a second thickness when the second object is moved across layer 14CG. The first and second objects may be any suitable objects (one or more different types of stylus, a finger, and/or other objects). If desired, light at each angle may be associated with a different respective color and dedicated sets of detectors (each responsive to a different color) may be used.

The foregoing is merely illustrative and various modifications can be made to the described embodiments. The foregoing embodiments may be implemented individually or in any combination.

| Table of Reference Numerals | | | |
|---|---|---|---|
| 10 | Electronic device | 12 | Input-output devices |
| 14 | Display | 18 | Sensors |
| 16 | Control circuitry | 22 | Housing |
| P, P-1, P-2, P', P" | Pixels | 30 | Interior Region |
| F | Front face | 36 | Components |
| 32 | Exterior region | 38 | Substrate |
| 14P | Display Panel | 14CG | Display Cover Layer |
| 34 | Finger | 40 | Viewer |
| 42 | Direction | 44 | Backlight unit |
| 46, 46', 48, 48' | Light | 50 | Layer |
| A | Angle | 60 | Water |
| n | Surface Normal | 52 | Light Source |
| 54 | Collimator | 56 | Prism |
| 70 | Pixel Definition Layer | 66 | Anode |
| 68 | Organic Layers | 64 | Thin-film Layers |
| 62 | Substrate | 72 | Encapsulation Layers |
| 74 | Semiconductor Dies | 78 | Index-Matching Layer |
| 80 | Opening | 76 | Mask |
| 86 | Lens | 88, 88' | Mask |
| 90 | Opening | 82 | Filter |
| 84 | Transparent Layer | P1, P2 | Time Periods |
| 92 | Diodes | 94 | Optical Components |
| BP | Backlight Unit Pixels | 98 | Backlight Unit |
| 96 | Optical Components | | |

What is claimed is:

1. An electronic device configured to gather touch input from a finger, comprising:
   a display having a display cover layer with a surface; and
   an optical touch sensor having a light source and light detectors,
      wherein the light source is configured to emit light into the display cover layer,
      wherein the emitted light is guided within the display cover layer by total internal reflection while the surface of the display cover layer is exposed to water,
      wherein total internal reflection is locally defeated to scatter the emitted light towards the light detectors when the surface is contacted by the finger, and
      wherein total internal reflection is not locally defeated when the surface is exposed to water.

2. The electronic device defined in claim 1 wherein the light detectors are arranged in an array extending across the display.

3. The electronic device defined in claim 1 wherein the display has an array of light-emitting diodes configured to display an image.

4. The electronic device defined in claim 3 wherein the light source is overlapped by the array of light-emitting diodes.

5. The electronic device defined in claim 1 wherein the display cover layer comprises glass.

6. The electronic device defined in claim 1 wherein the display cover layer comprises sapphire.

7. The electronic device defined in claim 1 wherein each light detector is overlapped by an angular light filter.

8. An electronic device configured to gather touch input from an external object, comprising:
   a housing;
   a display coupled to the housing, wherein the display has an array of diodes configured to emit image light; and
   an optical touch sensor configured to gather touch input from the external object when the external object is touching a surface of the display, wherein:
      the optical touch sensor comprises an array of light sensors configured to measure light scattered from the external object while the display is exposed to water and the external object is touching the surface of the display; and
      the array of diodes comprises first diodes that are configured to also serve as the array of light sensors.

9. The electronic device defined in claim 8 wherein the display comprises a display cover layer and wherein the optical touch sensor comprises a light source coupled to an edge of the display cover layer.

10. The electronic device defined in claim 8 wherein the display comprises a glass display cover layer.

11. The electronic device defined in claim 8 wherein the display comprises a sapphire display cover layer.

12. The electronic device defined in claim 8 wherein the optical touch sensor comprises at least one light source configured to emit light.

13. The electronic device defined in claim 12 wherein the at least one light source comprises an infrared light source.

14. The electronic device defined in claim 12 wherein the at least one light source is configured to modulate the emitted light and wherein the light sensors are configured to synchronously demodulate the scattered light.

15. The electronic device defined in claim 8 wherein each light sensor is overlapped by an angular light filter.

16. An electronic device configured to gather touch input from a finger, comprising:
   a display having a display cover layer with a surface, wherein the display comprises an array of diodes; and
   an optical touch sensor having a light source and light detectors,
      wherein the light source is configured to emit light into the display cover layer,
      wherein the emitted light is guided within the display cover layer by total internal reflection while the surface of the display cover layer is exposed to water droplets,
      wherein total internal reflection is locally defeated to scatter the emitted light towards the light detectors when the surface is contacted by the finger,
      wherein the array of diodes comprises first diodes that are configured to serve as light sources for the display when forward biased, and
      wherein the first diodes are configured to serve as the light detectors for the optical touch sensor when reverse biased.

17. The electronic device defined in claim 16 wherein the display cover layer comprises glass.

18. The electronic device defined in claim 16 wherein the display cover layer comprises sapphire.

* * * * *